US 11,356,351 B2

(12) United States Patent
Karapantelakis et al.

(10) Patent No.: US 11,356,351 B2
(45) Date of Patent: Jun. 7, 2022

(54) METHOD AND COORDINATING NODE FOR PROVIDING CURRENT ANALYSIS RESULT RELATING TO A LINK

(71) Applicant: Telefonaktiebolaget LM Ericsson (publ), Stockholm (SE)

(72) Inventors: Athanasios Karapantelakis, Solna (SE); Lackis Eleftheriadis, Gävle (SE); Rafia Inam, Västerås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/754,499

(22) PCT Filed: Oct. 23, 2017

(86) PCT No.: PCT/SE2017/051041
§ 371 (c)(1),
(2) Date: Apr. 8, 2020

(87) PCT Pub. No.: WO2019/083417
PCT Pub. Date: May 2, 2019

(65) Prior Publication Data
US 2020/0344142 A1 Oct. 29, 2020

(51) Int. Cl.
*H04L 43/10* (2022.01)
*H04L 41/12* (2022.01)
(Continued)

(52) U.S. Cl.
CPC .............. *H04L 43/10* (2013.01); *H04L 41/12* (2013.01); *H04L 43/0829* (2013.01); *H04L 43/0852* (2013.01); *H04L 43/16* (2013.01)

(58) Field of Classification Search
CPC ..... H04L 43/10; H04L 41/12; H04L 43/0829; H04L 43/0852; H04L 43/16
See application file for complete search history.

(56) References Cited

U.S. PATENT DOCUMENTS 7,107,498 B1 * 9/2006 Schmidt ................. H04L 1/203
714/704
9,001,667 B1 * 4/2015 Khanna ............... H04L 41/0631
370/241
(Continued)

FOREIGN PATENT DOCUMENTS

EP       2337268 B1    12/2012

OTHER PUBLICATIONS

Christos Gkantsidis, "Network Tomography," (https://www.cc.gatech.edu/~dovrolis/Courses/8803_F03/christos.pdf), published Nov. 6, 2003, 34 pages.

(Continued)

*Primary Examiner* — Brian Whipple
*Assistant Examiner* — James Ross Hollister
(74) *Attorney, Agent, or Firm* — Sage Patent Group

(57) ABSTRACT

A method and a coordinating node for providing at least one current analysis result relating to a link are disclosed. The coordinating node obtains a set of previous analysis results relating to at least one segment of the link. The coordinating node identifies a set of unreliable segments based on the set of previous analysis results and based on a condition for defining any segment as unreliable. The coordinating node performs a respective analysis of each unreliable segment of the set of unreliable segments to obtain a respective current analysis result for said each unreliable segment. Furthermore, the coordinating node sends, to the first node, the respective current analysis result. A corresponding computer program and a computer program carrier are also disclosed.

20 Claims, 4 Drawing Sheets

(51) Int. Cl.
    *H04L 43/0829*     (2022.01)
    *H04L 43/0852*     (2022.01)
    *H04L 43/16*     (2022.01)

(56) References Cited

U.S. PATENT DOCUMENTS

| | | | |
|---|---|---|---|
| 2006/0126495 A1* | 6/2006 | Guichard | H04L 41/0677 370/216 |
| 2014/0321311 A1* | 10/2014 | Groenendijk | H04L 41/0631 370/252 |
| 2015/0023151 A1* | 1/2015 | Liu | H04L 41/0681 370/218 |
| 2015/0071108 A1* | 3/2015 | Lumezanu | H04L 43/0852 370/253 |
| 2016/0285729 A1* | 9/2016 | Chinthalapati | H04L 41/0677 |
| 2018/0262414 A1* | 9/2018 | Burbridge | H04L 43/10 |
| 2018/0270141 A1* | 9/2018 | Burbridge | H04L 43/0811 |

OTHER PUBLICATIONS

International Search Report and Written Opinion of the International Searching Authority for PCT International Application No. PCT/SE2017/051041 dated Jun. 26, 2018.

Examination Report, Indian Patent Application No. 202047016603, dated Nov. 5, 2021, 7 pages.

\* cited by examiner

METHOD AND COORDINATING NODE FOR PROVIDING CURRENT ANALYSIS RESULT RELATING TO A LINK

CROSS REFERENCE TO RELATED APPLICATION

This application is a 35 U.S.C. § 371 national stage application of PCT International Application No. PCT/SE2017/051041 filed on Oct. 23, 2017, the disclosure and content of which is incorporated by reference herein in its entirety.

TECHNICAL FIELD

Embodiments herein relate to computer networks, such as communication networks, cellular networks, core networks or the like. In particular, a method and a coordinating node for providing at least one current analysis result relating to a link between a first node and a second node are disclosed. A corresponding computer program and a computer program carrier are also disclosed.

BACKGROUND

A computer network typically interconnects a plurality of computers, such as servers, nodes, endpoints, or the like, by means of a link, such as a network link, communication link or the like.

As an example, two computers can be interconnected by means of a link, including three segments. There may then be two intermediate computers, such as routers, switches and the like, along the link. End-to-end between the two computers, there is thus a link, built up by three segments, carrying communication between these two computers. When one of the computers experiences problems with the communication, e.g. cannot transmit or fails to receive data, it is suspected that there is a fault on the link.

In order to find, or localize, the fault, it is required to debug the link. This means e.g. that the segment that caused the communication problem shall be identified. However, debugging the link end-to-end is a time-consuming process, since between the endpoints, i.e. the two computers, there may—as mentioned—exist a number of intermediate computers which forwards the communication, i.e. data traffic, such that the two computers can exchange information with each other. Typically, the intermediate computers are switches or routers which perform a task of directing the communication from one subnet to another subnet of the computer network.

This kind of debugging may involve execution of various network diagnostic tools, including traffic measurement tools, packet capturing and deep packet inspection tools and the like. Some examples are Internet Control Message Protocol (ICMP)-based ping, IPefr, Transport Control Protocol (TCP)-dump, Wireshark etc.

The debugging not only involves use of a combination of the aforementioned tools in order to provide a diagnosis, but many times the debugging is carried out on different parts of the computer network, e.g. on segments between intermediate switches or routers. Disadvantageously, it is thus not enough to apply the aforementioned network diagnostic tools end-to-end, but separate analysis of the segments of the link is required in many cases. Unfortunately, it is time consuming to analyze the segments of the link.

Known approaches classified under the term "network tomography" attempts to infer network topology and identify packet loss—"loss tomography"—or delay—"delay tomography"—in links in a computer network by measurements on the endpoints of the link. Also, these known approaches may be improved in terms of time required for analysis.

SUMMARY

An object may be to reduce time for fault localization in a computer network of the abovementioned kind.

According to an aspect, the object is achieved by a method, performed by a coordinating node, for providing at least one current analysis result relating to a link between a first node and a second node. The coordinating node obtains a set of previous analysis results relating to at least one segment of the link. Each previous analysis result relates to whether or not said at least one segment is unreliable or reliable according to a respective previous analysis of a respective segment of the link. The coordinating node identifies a set of unreliable segments based on the set of previous analysis results and based on a condition for defining any segment as unreliable. Furthermore, the coordinating node performs a respective analysis of each unreliable segment of the set of unreliable segments to obtain a respective current analysis result for said each unreliable segment. The coordinating node sends, to the first node, the respective current analysis result.

According to another aspect, the object is achieved by a coordinating node configured for providing at least one current analysis result relating to a link between a first node and a second node. The coordinating node is configured for obtaining a set of previous analysis results relating to at least one segment of the link. Each previous analysis result relates to whether or not said at least one segment is unreliable or reliable according to a respective previous analysis of a respective segment of the link. The coordinating node is configured for identifying a set of unreliable segments based on the set of previous analysis results and based on a condition for defining any segment as unreliable. Moreover, the coordinating node is configured for performing a respective analysis of each unreliable segment of the set of unreliable segments to obtain a respective current analysis result for said each reliable segment. The coordinating node is configured for sending, to the first node, the respective current analysis result.

According to further aspects, the object is achieved by a computer program and a computer program carrier corresponding to the aspects above.

Thanks to that the coordinating node identifies the set of unreliable segments based on the set of previous analysis results and based on a condition for defining any segment as unreliable, the coordinating node may choose to perform the respective analysis of each unreliable segment of the set of unreliable segments to obtain the respective current analysis result for said each reliable segment. This may for example mean that the coordinating node waits with, or refrains from, analysis of any segments that may be identified as reliable. As soon as said each unreliable segment may have been analysed, the coordinating node sends, to the first node, the respective current analysis result. Thus, time for reception of the respective current analysis result at the first node is reduced.

An advantage is hence that the embodiments herein may save time for debugging of links by localizing the segment that caused communication problem. In this manner, the embodiments provide information on which part, i.e. which segment, of the link that exhibited a fault.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
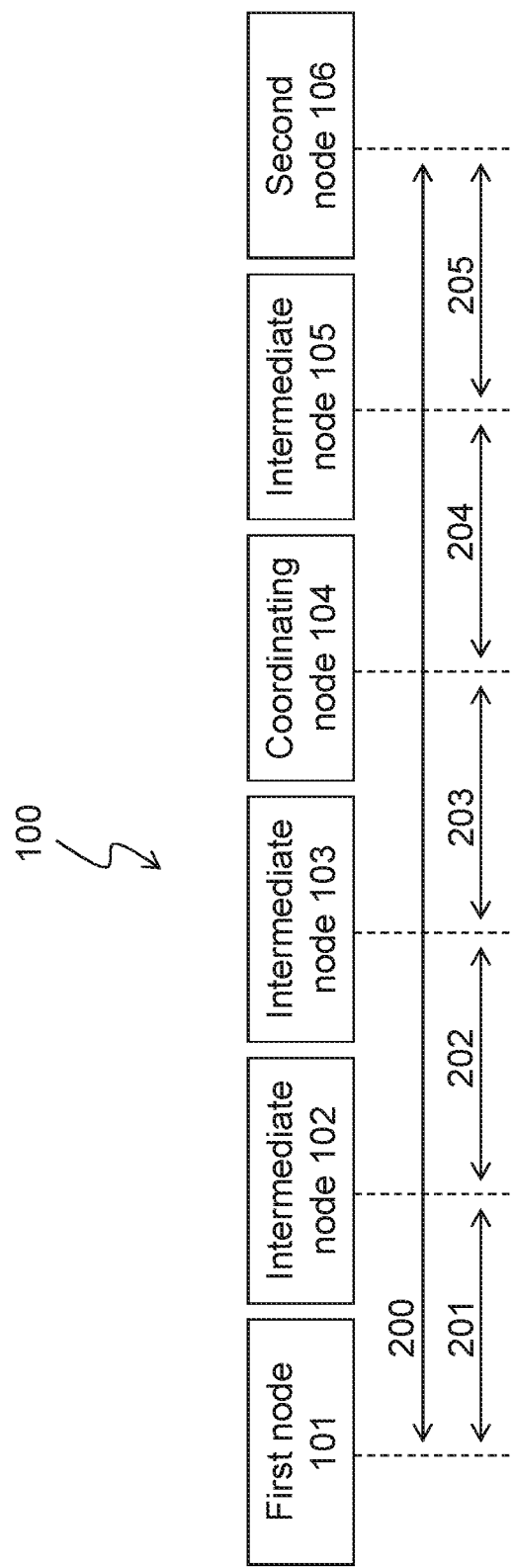
FIG. 1 is a schematic overview of an exemplifying network in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying computer network 100 in which embodiments herein may be implemented. In this example, the computer network 100 is a Transport Control Protocol/Internet Protocol (TCP/IP) network. In other examples, the network 100 may be any other packet switched computer network, such as User Datagram Protocol/Internet Protocol (UDP/IP), X.25, Frame Relay and Multiprotocol Label Switching (MPLS).

The computer network 100 may be said to comprise a first node 101, an intermediate node 102, a further intermediate node 103, a coordinating node 104, a yet further intermediate node 105 and a second node 106. The first node 101 may be referred to as a first endpoint EPA and the second node 106 may be referred to as a second endpoint EPB.

As an example, the first node 101 may be a client and the second node 106 may be a server, or vice versa. The first node 101 and the second node 106 are interconnected with each other by means of a link 200, such as a network link, a communication link or the like.

Intermediate nodes 102, 103, 105 may be computers, switches, routers or the like.

The coordinating node 104 may also be said to be intermediate with respect to the first and second nodes 101, 106, but as shall be explained further below the coordinating node 104 may take a role of coordinating analysis of segments 201-205 of the link 200. The link 200 may thus comprise a plurality of segments 201-205.

As used herein, the term "endpoint" may refer to a node that sends and/or receives traffic. The endpoints work, or operate, in pairs and a destination of traffic from one endpoint is the other endpoint. The traffic can be unidirectional, i.e. from the first node 101 to the second node 106 only or bidirectional, i.e. between the first node 101 and the second node 106, or vice versa.

As used herein, the term "intermediate node" (IMN) may refer to a node that is located along, or on, a link between the first and second nodes 101, 106. The intermediate nodes may be layer-3 (of Open System Interconnection "OSI" model) switches or routers, which routes traffic from one sub-network to another sub-network. The expression "node along the link" may refer to one or more nodes which forward information, carried on the link 200, between the first and second nodes 101, 106.

Figure 2:
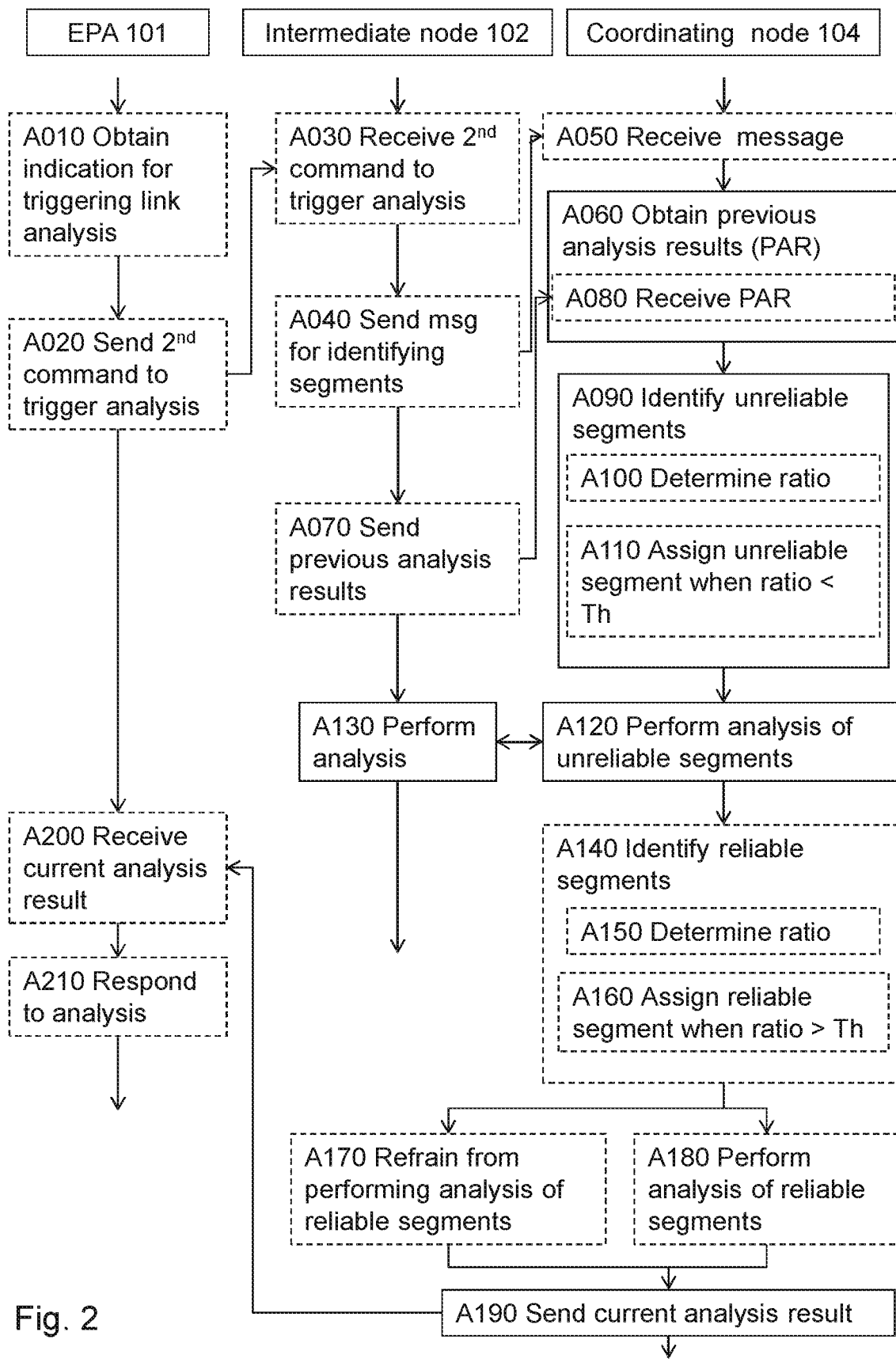
FIG. 2 is a combined signaling and flowchart illustrating the methods herein.

FIG. 2 illustrates an exemplifying method according to embodiments herein when implemented in the computer network 100 of FIG. 1. For reasons of simplicity, the flow chart of FIG. 2 only illustrates the first node 101, shown as EPA 101, the intermediate node 102, and the coordinating node 104.

The coordinating node 104 performs a method for providing at least one current analysis result relating to a link 200 between a first node 101 and a second node 106.

One or more of the following actions may be performed in any suitable order.

Action A010

The first node 101 may obtain an indication for triggering link analysis. As an example, the first node 101 may obtain the indication by detecting a delay in response(s) expected from the second node 106. As another example, the first node 101 may obtain the indication by receiving a first command to perform analysis, wherein the first command comprises the indication. The first command may be received from another node, a network operator, a user, a machine that is analysing the network, or the like. Moreover, the first command may be initiated by the node itself as part of self-maintenance schedule.

The first node 101 may thus decide that an analysis to localize the fault may need to be performed.

Action A020

Subsequent to action A010, the first node 101 may thus send a second command to trigger analysis to localize the fault to the intermediate node 102.

The second command, which may be a request for analysis, may include an indication about a fault type, i.e. what kind of network issue shall be analysed. The fault type may be packet loss, jitter, delay or any other fault type that may have caused the fault/delay. Programmatically, the issues may be denoted DELAY, JITTER, PACKET_LOSS as in the example below. Furthermore, the second command may include an address of the second node 106, such as an IP address thereof, and an analysis identity.

The analysis identity may be generated by the first node 101 in any appropriate manner. The analysis identity may be picked from a list, randomly generated etc. By means of the analysis identity, the first node 101 may distinguish different analysis sessions from each another. This means that the first node 101 may trigger analysis for localization of faults in different links at the same time. Then, when the first node 101 receives current analysis results, the first node 101 is able to find out for which link the current analysis result applies by checking the analysis identity.

The second command may be, e.g. when implemented in JSON format and sent using HTTP GET request, expressed as:

{"issue": "DELAY", "peer": "<other_EP_IP_address>"}

Note that the DELAY may also include an actual value of delay being acceptable in a network. Alternatively, the DELAY may a priori indicate an acceptable delay of e.g. 1 s or other suitable default value.

Furthermore, together with the second command, the address of the first node 101 is sent, e.g. the IP address of the first node 101.

The intermediate node 102 may be a local gateway, a default gateway or the like. In order to send the second command to the intermediate node 101, the second command may be broadcast in a local network of the first node 101 by setting time-to-live (IPv4) or hop limit (IPv6) fields of an IP header of the second command to 1.

Action A030

Accordingly, the intermediate node 102 may receive the second command from the first node 101 subsequently to action A020.

The intermediate node 102 may also identify (not shown) the link 200, aka network path, e.g. by obtaining IP addresses of the intermediate nodes along the link 200, e.g. by means of an IP address of the second node 106. The intermediate node 102 may use any appropriate utility, such as Traceroute or the like, in order to obtain information about network topology, such as the IP addresses of the intermediate nodes.

In this manner, the intermediate node 102 may obtain information identifying the segments of the link 200 and/or the intermediate nodes along the link 200, e.g. in the form of a list of IP addresses or the like.

Moreover, the intermediate node 102 may initiate an election procedure for choosing the coordinating node 104. In some example, an intermediate node at the middle of the link 200 may be elected, where the middle may mean that an amount of segments between the elected intermediate node and the first node 101 is equal to, or approximately equal to, an amount of segments between the elected intermediate node and the second node 106.

The election procedure may be performed randomly in that the intermediate node 102 randomly selects one of the intermediate nodes of the link 200 to act as the coordinating node 104. In other examples, the election procedure may be any known leader election algorithm based on one or more objective factors, such as current work load of each intermediate node, current processing capacity of each intermediate node, etc. Hence, according to known manners, the intermediate nodes, including the coordinating node to be elected, may in this fashion agree upon which node shall act as the coordinating node 104.

In the following, it is assumed that the coordination node 104 handles coordination of the analysis.

Action A040

Now that the intermediate node 102 has received the second command, the intermediate node 102 may send, or transmit, a message for identifying segments of the link 200 to the coordinating node 104. In this manner, the intermediate node 102 provides information about segments of the link in order for each of the segments to be analysed.

Action A040 may be performed in response to a reception (not shown) of a request from the coordinating node 104 or without such request.

Action A050

Subsequent to action A040, the coordinating node 104 may receive the message for identifying segments of the link 200. The message includes identifiers of nodes along the link 200. The identifiers may be IP addresses of the nodes along the link 200, or other suitable identification means.

In this manner, the coordinating node 104 may be informed about which segments it is expected to analyse in order to identify faulty segments.

Action A060

In order to identify, as in action A090 below, which segments to perform analysis on, the coordinating node 104 obtains a set of previous analysis results relating to at least one segment of the link 200. Each previous analysis result relates to whether or not said at least one segment is unreliable or reliable according to a respective previous analysis of a respective segment of the link 200.

In some embodiments, the set of previous analysis results may further comprise a respective time, being elapsed since a most recent previous analysis. These embodiments may be referred to as "time considering"-embodiments. The respective time may be a timestamp, a point in time or the like.

As shown in action A120 below, it may be that the coordinating node 104 begins with a respective analysis of each unreliable segment, aka each suspicious segment. That is to say, said each unreliable segment may refer to a particular segment that had experienced problems previously. These segments may thus be checked first.

Now continuing with action A070 performed by the intermediate node 102.

Action A070

The intermediate node 102 may send, e.g. on request from the coordinating node 104 or without such request, a set of previous analysis results to the coordinating node 104.

In some embodiments, action A060 may comprise an action A080.

Action A080

Accordingly, the coordinating node 104 may receive, from at least one node along the link 200, the set of previous analysis results. If there are no previous results, the set of previous analysis results may be empty. However, if action A090 is to be performed, the set of previous analysis results may not be empty, i.e. the set includes one or more previous analysis result(s). This may thus mean that the obtaining A060 of the set of previous analysis results comprises, or may be performed by, receiving the set of previous analysis results.

Alternatively or even additionally, the coordinating node 104 may retrieve the set of previous analysis results, or at least a portion thereof, from a memory accessible by the coordinating node 104.

This means that some or all of the set of previous analysis results may be stored in a central manner or a distributed manner.

Action A090

Since the coordinating node 104 has obtained the set of previous analysis results, the coordinating node 104 now identifies a set of unreliable segments based on the set of previous analysis results and based on a condition for defining any segment as unreliable.

With the "time considering"-embodiments, the coordinating node 104 may identify the set of unreliable segments further based on the respective time. In this manner, the coordinating node 104 may allow more recent previous analysis result to influence the identification of unreliable segments more than less recent previous analysis results. For example, this may result in that one very recent previous analysis result indicating unreliable may dominate over e.g. two or three older previous analysis results indicating reliable.

Action A090 is explained in more detail with reference to action A100 and A110 directly below.

In some embodiments, including e.g. action A100 and A110, the condition may comprise a threshold value for defining said any segment as reliable due to an amount of positive results for said any segment in a time frame.

Action A090 for identifying the set of unreliable segments may according to these embodiments comprise, for each segment of said at least one segment, action A100 and A110.

Action A100

In this action, the coordinating node 104 may therefore determine, based on the set of previous analysis results, a ratio between a first number of positive results of the set of previous analysis results and a second number of negative results of the set of previous analysis results. The ratio is determined for the time frame. When the coordinating node 104 performs action A100, the ratio may be determined for a particular segment, i.e. for said each segment. This means that the ratio may be different for different segments. Expressed differently, a respective ratio is determined for said each segment.

Notably, action A100 is performed for said each segment.

Action A110

Also this action is performed for said each segment. In order to identify the set of unreliable segments, the coordinating node 104 may assign said each segment to the set of unreliable segments when the ratio for said each segment is less than the threshold value for defining said any segment as reliable.

The terms "positive" and "negative" refers to how the previous analysis results are interpreted, not to whether or not actual values of the previous analysis results are positive or negative, i.e. above or below zero. Hence, said each previous analysis result may be deemed positive or negative, i.e. interpreted as positive or negative, according to the respective previous analysis. That is to say, a previous analysis result is deemed positive when the previous analysis indicated that the segment was working properly, e.g. delay on that segment is less than a threshold value indicating acceptable delay. Similarly, a previous analysis result is deemed negative when the previous analysis indicated that the segment was not working properly, e.g. delay on that segment is greater than or equal to the threshold value indicating acceptable delay. This means that the term positive may be used herein to indicate that a particular segment is deemed reliable based on a single, or only a few, analyses. Expressed somewhat differently, positive result may refer to when any previous analysis indicates that said each segment fulfils operating conditions and negative result may refer to when any previous analysis indicates that said each segment is deemed faulty.

Action A120

Figure 3:
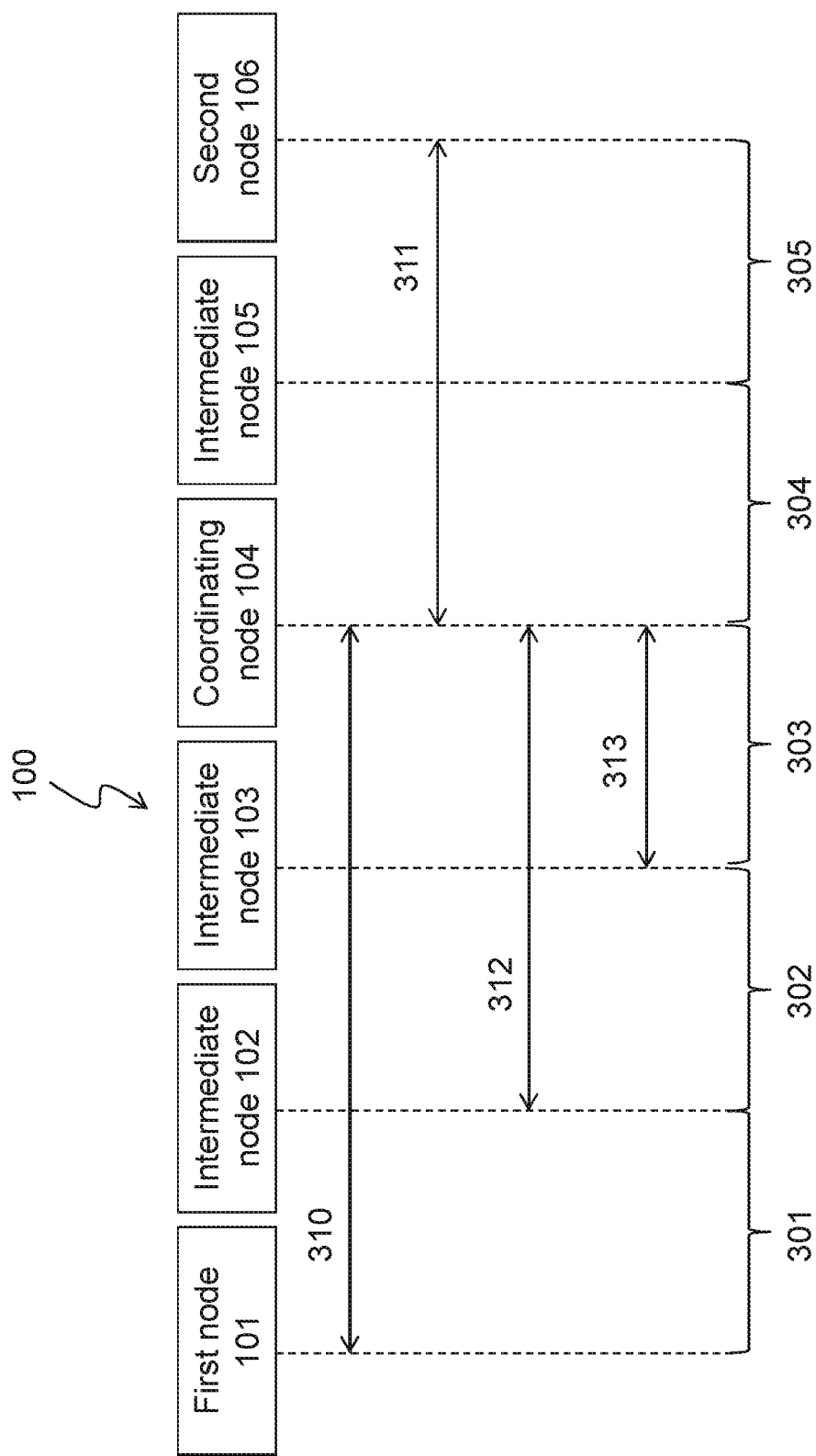
FIG. 3 is an illustration of analysis coordinated by the coordinating node.

Since the set of unreliable segments has been identified, the coordinating node 104 performs a respective analysis of each unreliable segment of the set of unreliable segments to obtain a respective current analysis result for said each unreliable segment. This action is typically performed before action A170 and/or action A180. A set of current analysis results comprises the respective current analysis result for said each unreliable segment. The entire set of current analysis results or a portion thereof may be sent in action A190 below. Coordination of analysis performed by the coordinating node 104 is illustrated in FIG. 3.

The respective analysis of each unreliable segment may be performed using any known network diagnostic tool, such as TCP/IP-ping, Wireshark, etc. This means that the intermediate node 102 may also be involved when the respective analysis is performed.

In this manner, those segments that are considered to be unreliable are analysed first, e.g. before reliable segments are analysed. Hence, it is expected that the fault may be found among the set of unreliable segments. Should this hypothesis be correct, time is saved since then, i.e. when the fault is found among the set of unreliable segments, no further segments, such as the reliable segments, may need to be analysed.

In some examples of the "time considering"-embodiments, it may be that the coordinating node 104 performs, e.g. only performs, action A120 when the respective time lapsed for said each segment exceeds a threshold value indicating maximum allowed time since previous analysis in order to obtain the respective current analysis result for said each unreliable segment.

Action A130

Thus, in connection with action A120, the intermediate node 102 may perform analysis, e.g. by responding to any messages sent by the coordinating node 104 when executing action A120 above.

In some further embodiments, the condition further defines said any segment as reliable, i.e. enables identification of reliable segments.

Action A140

In these further embodiments, the coordinating node 104 may thus identify a set of reliable segments based on the set of previous analysis results and based on the condition. This action may be performed before or after action A090, but preferably after action A120.

With the "time considering"-embodiments, the coordinating node 104 may identify the set of reliable segments further based on the respective time. As mentioned above, the coordinating node 104 may in this fashion allow more recent previous analysis result to influence the identification of reliable segments more than less recent previous analysis results.

In order elaborate on how to identify the reliable segments, action A150 and action A160 are provided. Hence, action A140 for identifying the set of reliable segments may comprise, for each segment of said at least one segment, action A150 and A160.

Action A150

In this action, the coordinating node 104 may therefore determine, based on the set of previous analysis results, a ratio between a first number of positive results of the set of previous analysis results and a second number of negative results of the set of previous analysis results. The respective ratio is determined for the time frame. Similar observations and examples as in action A100 may be made here, but are omitted for avoiding undue repetition.

Action A160

The coordinating node 104 may assign said each segment to the set of reliable segments when the ratio for said each segment exceeds the threshold value for defining said any segment as reliable.

However, sometimes, it may be that action A140 is performed when action A100 and A110 have been performed. Then action A140 for identifying the set of reliable segments may in these cases comprise, for each segment of said at least one segment, only that the coordinating node 104 may assign said each segment to the set of reliable segments when the ratio for said each segment exceeds the threshold value for defining said any segment as reliable.

At this stage, a set of volatile segments may include those segments that are not considered unreliable and that are not considered reliable. This may happen according to some embodiments with which the condition may comprise a first sub-condition and a second sub-condition, where the first sub-condition is different from the second sub-condition. The first sub-condition may define whether said any segment shall be considered unreliable or not and the second sub-condition may define whether said any segment shall be considered reliable or not. Since the first and second sub-conditions are different, some segments will be considered volatile, i.e. neither unreliable nor reliable. If the first and second sub-conditions are the same, or equal, no segments will be considered volatile.

Likewise, the threshold value for defining said any segment as reliable may comprise a first sub-threshold value and a second sub-threshold value, where the first sub-threshold value is different from the second sub-threshold value. The first sub-threshold value may define whether said any segment shall be considered unreliable or not and the second sub-threshold value may define whether said any segment shall be considered reliable or not. If the first and second sub-threshold values are the same, or equal, no segments will be considered volatile.

The coordinating node 104 may then perform the respective analysis of each volatile segment of the set of volatile segments in order to obtain a respective current volatile analysis result. The set of current analysis results may comprise the respective current volatile analysis result for said each volatile segment.

Action A170

In some embodiments, the coordinating node 104 may refrain from performing the respective analysis of each reliable segment of the set of reliable segments. This means that the no current analysis result is provided for the reliable segments. This may for example be the case when it is considered that the previous analysis result(s) of the reliable segments are still sufficiently recent. For example, the previous analysis result(s) may have a time stamp that indicates an age of less than a threshold value for indicating an acceptable age.

In some embodiments, the method may comprise action A180, which may preferably be performed after action A120 of performing the respective analysis of each unreliable segment.

Action A180

Accordingly, the coordinating node 104 may perform a respective analysis of each reliable segment to obtain a respective current further analysis result for said each reliable segment. The set of current analysis results may comprise the respective current further analysis result for said each reliable segment.

In this manner, the reliable segments are analysed last, i.e. after the unreliable segments and/or after the volatile segments have been analysed.

In some further examples of the "time considering"-embodiments, it may be that the coordinating node 104 performs, e.g. only performs, action A180 when the respective time lapsed for said each segment exceeds the threshold value indicating the maximum allowed time since previous analysis in order to obtain the respective current analysis result for said each reliable segment.

Action A190

Each current analysis result may preferably be reported to the first node 101. Hence, the coordinating node 104 sends, to the first node 101, the respective current analysis result.

This action may be performed, at least for the respective current analysis result related to unreliable segments, directly after, or almost directly after, action A120. When the respective current analysis result is related to reliable segments, this action may be performed after action A180.

Action A200

Subsequent to action A190, the first node 101 may receive the respective current analysis result.

In some examples, the coordinating node 104 may gather at least a plurality of respective current analysis results and report back a list of IP addresses to the first node 101. It may be that the plurality of respective current analysis results is associated with unreliable segments. The IP addresses of the list identify those intermediate nodes for which a fault is detected. Hence, with these examples the coordinating node 104 sends a list of IP addresses to the first node 101.

Action A210

Now that the first node 101 has received one or more respective current analysis result(s), the first node 101 may respond to the analysis, e.g. by recreating the link 200 while excluding one or more segments which were found to be unreliable, faulty, degenerated or the like. In this manner, rerouting via other intermediate nodes may be achieved.

Thanks to that the coordinating node 104 provides the respective current analysis result for each of the unreliable segments, it may—when a fault has occurred in one of the unreliable segments—be that the first node 101 may take corrective actions to mitigate consequences of the fault sooner than it otherwise would have been able to when receiving results for all segments.

FIG. 3 is a signaling chart illustrating coordination of analysis relating to segments 301-305 of a link 300. FIG. 3 may be a more detailed description of action A120 and/or A180 for any segments, be it unreliable, reliable and/or volatile. Assume delay of segments is analyzed.

The coordinating node 104 may then send a ping message 310 to the first node 101 in order to obtain a measure of the delay. Assume delay to be 1000 ms for segments 301-303 analyzed by thanks to this ping message 310. The coordinating node 104 may then continue by sending a further ping message 311 to the second node 106 to analyze segments 304-305. Assume the delay to be 80 ms. The coordinating node 104 may then conclude that the fault is among the segments 301-303, since the delay for segments 304-305 was below a threshold value of e.g. 100 ms.

Now the coordinating node 104 continues by sending another ping message 312 to the intermediate node 102 and obtains a delay of 900 ms, which still is above the threshold value, for is valid for segments 302 and 303 together. In order to find out whether the fault is in segment 302 or segment 303, the coordinating node 104 send a still further ping message 313 to the intermediate node 103 and obtains a delay of 800 ms. Now, the coordinating node 104 may conclude that the fault is on segment 303 between the intermediate node 103 and the coordinating node 104 itself.

Accordingly, the coordinating node 104 may report back to the first node 101 that the fault is on segment 303, which may be identified by e.g. the IP addresses of the coordinating node 104 and the intermediate node 103.

Figure 4:
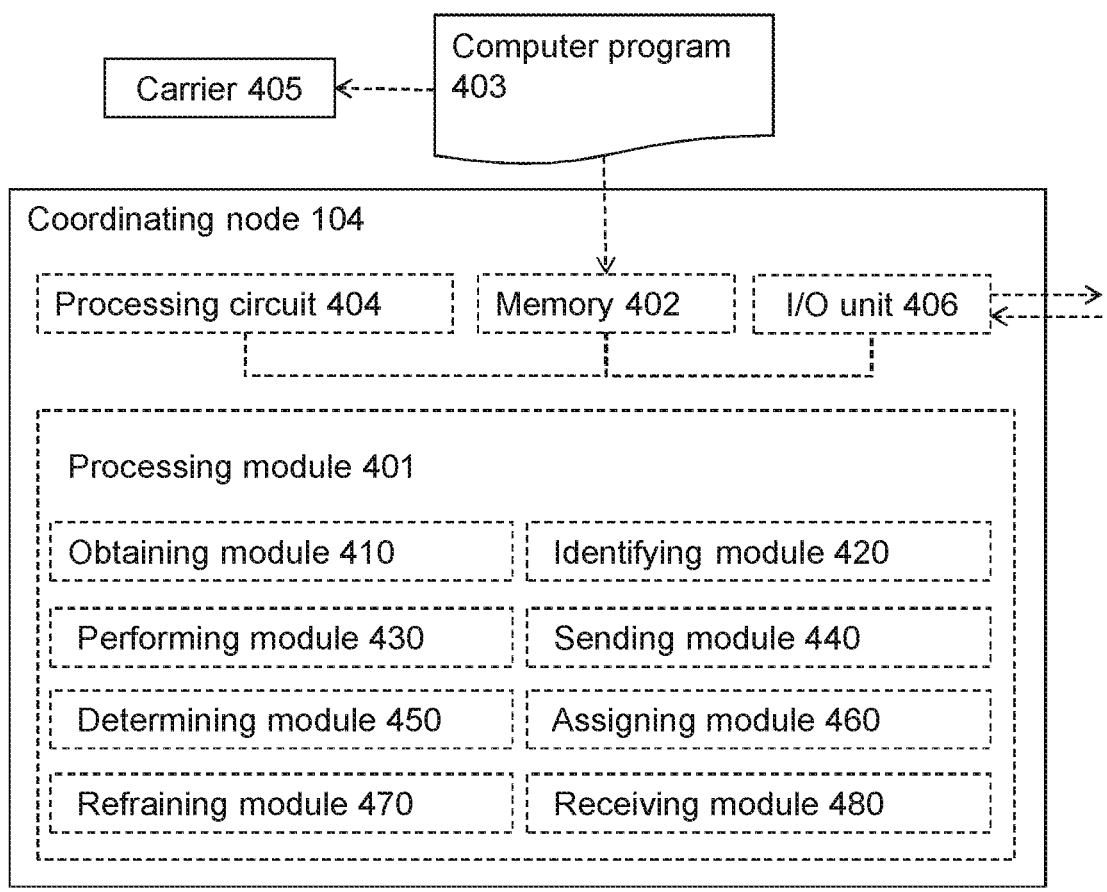
FIG. 4 is a block diagram illustrating embodiments of the coordinating node.

With reference to FIG. 4, a schematic block diagram of embodiments of the coordinating node 104 of FIG. 1 is shown.

The coordinating node 104 may comprise a processing module 401, such as a means for performing the methods described herein. The means may be embodied in the form of one or more hardware modules and/or one or more software modules The coordinating node 104 may further comprise a memory 402. The memory may comprise, such as contain or store, instructions, e.g. in the form of a computer program 403, which may comprise computer readable code units.

According to some embodiments herein, the coordinating node 104 and/or the processing module 401 comprises a processing circuit 404 as an exemplifying hardware module, which may comprise one or more processors. Accordingly, the processing module 401 may be embodied in the form of, or 'realized by', the processing circuit 404. The instructions may be executable by the processing circuit 404, whereby the coordinating node 104 is operative to perform the methods of FIG. 2. As another example, the instructions, when executed by the coordinating node 104 and/or the processing circuit 404, may cause the coordinating node 104 to perform the method according to FIG. 2.

In view of the above, in one example, there is provided a coordinating node 104 for providing at least one current analysis result relating to a link 200 between a first node 101 and a second node 106. Again, the memory 402 contains the instructions executable by said processing circuit 404 whereby the coordinating node 104 is operative for:

obtaining a set of previous analysis results relating to at least one segment of the link 200, wherein each previous analysis result relates to whether or not said at least one segment is unreliable or reliable according to a respective previous analysis of a respective segment of the link 200, identifying a set of unreliable segments based on the set of previous analysis results and based on a condition for defining any segment as unreliable, performing a respective analysis of each unreliable segment of the set of unreliable segments to obtain a respective current analysis result for said each unreliable segment, and sending, to the first node 101, the respective current analysis result.

FIG. 4 further illustrates a carrier 405, or program carrier, which comprises the computer program 403 as described directly above. The carrier 405 may be one of an electronic signal, an optical signal, a radio signal and a computer readable medium.

In some embodiments, the coordinating node 104 and/or the processing module 401 may comprise one or more of an obtaining module 410, an identifying module 420, a performing module 430, a sending module 440, a determining module 450, an assigning module 460, a refraining module 470, and a receiving module 480 as exemplifying hardware modules. In other examples, one or more of the aforementioned exemplifying hardware modules may be implemented as one or more software modules.

Moreover, the coordinating node 104 and/or the processing module 401 comprise an Input/Output unit 406, which may be exemplified by the receiving module and/or the sending module when applicable.

Accordingly, the coordinating node 104 is configured for providing at least one current analysis result relating to a link 200 between a first node 101 and a second node 106.

Therefore, according to the various embodiments described above, the coordinating node 104 and/or the processing module 401 and/or the obtaining module 410 is configured for obtaining a set of previous analysis results relating to at least one segment of the link 200. Each previous analysis result relates to whether or not said at least one segment is unreliable or reliable according to a respective previous analysis of a respective segment of the link 200. The coordinating node 104 and/or the processing module 401 and/or the identifying module 420 is configured for identifying a set of unreliable segments based on the set of previous analysis results and based on a condition for defining any segment as unreliable. The coordinating node 104 and/or the processing module 401 and/or the performing module 430 is configured for performing a respective analysis of each unreliable segment of the set of unreliable segments to obtain a respective current analysis result for said each unreliable segment. The coordinating node 104 and/or the processing module 401 and/or the sending module 440 is configured for sending, to the first node 101, the respective current analysis result.

In some embodiments, the condition may comprise a threshold value for defining said any segment as reliable due to an amount of positive results for said any segment in a time frame. The coordinating node 104 and/or the processing module 401 and/or the identifying module 420 may be configured for identifying the set of unreliable segments by, for each segment of said at least one segment, being configured for, e.g. by means of a determining module 450, for determining, based on the set of previous analysis results, a ratio between a first number of positive results of the set of previous analysis results and a second number of negative results of the set of previous analysis results. The ratio may be determined for the time frame. The coordinating node 104 and/or the processing module 401 and/or the assigning module 410 may be configured for, for each segment of said at least one segment, assigning said each segment to the set of unreliable segments when the ratio for said each segment is less than the threshold value.

The condition may further define said any segment as reliable. The coordinating node 104 and/or the processing module 401 and/or the identifying module 420 may then be configured for identifying a set of reliable segments based on the set of previous analysis results and based on the condition.

The coordinating node 104 and/or the processing module 401 and/or the refraining module 470 may be configured for refraining from performing the respective analysis of each reliable segment of the set of reliable segments.

The coordinating node 104 and/or the processing module 401 and/or the performing module 430 may be configured for performing a respective analysis of each reliable segment to obtain a respective current further analysis result for said each reliable segment, after performing the respective analysis of each unreliable segment.

The condition may comprise a threshold value for defining said any segment as reliable due to an amount of positive results for said any segment in a time frame. The coordinating node 104 and/or the processing module 401 and/or the identifying module 420 may be configured for identifying the set of reliable segments by being configured, e.g. by means of the determining module 450, for each segment of said at least one segment, for determining, based on the set of previous analysis results, a ratio between a first number of positive results of the set of previous analysis results and a second number of negative results of the set of previous analysis results. The respective ratio may be determined for the time frame.

The coordinating node 104 and/or the processing module 401 and/or the assigning module 460 may be configured for assigning said each segment to the set of reliable segments when the ratio for said each segment exceeds the threshold value for each segment of said at least one segment.

The coordinating node 104 may be configured for identifying the set of reliable segments by assigning said each segment to the set of reliable segments when the ratio for said each segment exceeds the threshold value.

The coordinating node 104 and/or the processing module 401 and/or the obtaining module 410 may be configured for obtaining the set of previous analysis results by receiving, e.g. by means of the receiving module 480, from at least one node along the link, the set of previous analysis results.

The coordinating node 104 and/or the processing module 401 and/or the receiving module 480 may be configured for receiving a message for identifying segments of the link 200. The message may include identifiers of nodes along the link 200.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a coordinating node, for providing at least one current analysis result relating to a link between a first node and a second node, wherein the method comprises:

obtaining a set of previous analysis results relating to at least one segment of the link, wherein each previous analysis result relates to whether or not said at least one segment is unreliable or reliable according to a respective previous analysis of a respective segment of the link, identifying a set of unreliable segments based on the set of previous analysis results and based on a condition for defining any segment as unreliable, wherein the step of identifying the set of unreliable segments comprises, for each segment of said at least one segment:

determining, based on the set of previous analysis results, a ratio between a first number of positive results of the set of previous analysis results and a second number of negative results of the set of previous analysis results, wherein the ratio is determined for the time frame, performing a respective analysis of each unreliable segment of the set of unreliable segments to obtain a respective current analysis result for said each unreliable segment, and sending, to the first node, the respective current analysis result.

2. The method according to claim 1, wherein the condition comprises a threshold value for defining said any segment as reliable due to an amount of positive results for said any segment in a time frame, wherein the step of identifying the set of unreliable segments further comprises, for each segment of said at least one segment:
assigning said each segment to the set of unreliable segments when the ratio for said each segment is less than the threshold value.

3. The method according to claim 1, wherein the condition further defines said any segment as reliable, wherein the method comprises:
identifying a set of reliable segments based on the set of previous analysis results and based on the condition.

4. The method according to claim 3, wherein the method comprises:
refraining from performing the respective analysis of each reliable segment of the set of reliable segments.

5. The method according to claim 4, wherein the condition comprises a threshold value for defining said any segment as reliable due to an amount of positive results for said any segment in a time frame, wherein the step of identifying the set of reliable segments comprises, for each segment of said at least one segment:
determining, based on the set of previous analysis results, a ratio between a first number of positive results of the set of previous analysis results and a second number of negative results of the set of previous analysis results, wherein the respective ratio is determined for the time frame, and
assigning said each segment to the set of reliable segments when the ratio for said each segment exceeds the threshold value.

6. The method according to claim 4, wherein the condition comprises a threshold value for defining said any segment as reliable due to an amount of positive results for said any segment in a time frame, wherein the step of identifying the set of unreliable segments comprises, for each segment of said at least one segment:
determining, based on the set of previous analysis results, a ratio between a first number of positive results of the set of previous analysis results and a second number of negative results of the set of previous analysis results, wherein the ratio is determined for the time frame, and
assigning said each segment to the set of unreliable segments when the ratio for said each segment is less than the threshold value;
wherein the step of identifying the set of reliable segments comprises:
assigning said each segment to the set of reliable segments when the ratio for said each segment exceeds the threshold value.

7. The method according to claim 3, wherein the method comprises, after the performing of the respective analysis of each unreliable segment:
performing a respective analysis of each reliable segment to obtain a respective current further analysis result for said each reliable segment.

8. The method according to claim 1, wherein the obtaining of the set of previous analysis results comprises:
receiving, from at least one node along the link, the set of previous analysis results.

9. The method according to claim 8, wherein the nodes along the link refers to one or more nodes which forwards information, carried on the link, between the first and second nodes.

10. The method according to claim 1, wherein the method comprises:
receiving a message for identifying segments of the link, wherein the message includes identifiers of nodes along the link.

11. A coordinating node configured for providing at least one current analysis result relating to a link between a first node and a second node, wherein the coordinating node comprises a memory and at least one processing circuit, the memory comprising instructions executable by the at least one processing circuit, wherein the coordinating node is configured for:
obtaining a set of previous analysis results relating to at least one segment of the link, wherein each previous analysis result relates to whether or not said at least one segment is unreliable or reliable according to a respective previous analysis of a respective segment of the link,
identifying a set of unreliable segments based on the set of previous analysis results and based on a condition for defining any segment as unreliable, wherein the step of identifying the set of unreliable segments comprises, for each segment of said at least one segment:
determining, based on the set of previous analysis results, a ratio between a first number of positive results of the set of previous analysis results and a second number of negative results of the set of previous analysis results, wherein the ratio is determined for the time frame,
performing a respective analysis of each unreliable segment of the set of unreliable segments to obtain a respective current analysis result for said each unreliable segment, and
sending, to the first node, the respective current analysis result.

12. The coordinating node according to claim 11, wherein the condition comprises a threshold value for defining said any segment as reliable due to an amount of positive results for said any segment in a time frame, wherein the coordinating node is further configured for identifying the set of unreliable segments by, for each segment of said at least one segment:
assigning said each segment to the set of unreliable segments when the ratio for said each segment is less than the threshold value.

13. The coordinating node according to claim 11, wherein the condition further defines said any segment as reliable, wherein the coordinating node is configured for:
identifying a set of reliable segments based on the set of previous analysis results and based on the condition.

14. The coordinating node according to claim 13, wherein the coordinating node is configured for:
refraining from performing the respective analysis of each reliable segment of the set of reliable segments.

15. The coordinating node according to claim 14, wherein the condition comprises a threshold value for defining said any segment as reliable due to an amount of positive results for said any segment in a time frame, wherein the coordinating node is configured for identifying the set of reliable segments by, for each segment of said at least one segment
determining, based on the set of previous analysis results, a ratio between a first number of positive results of the set of previous analysis results and a second number of negative results of the set of previous analysis results, wherein the respective ratio is determined for the time frame, and assigning said each segment to the set of reliable segments when the ratio for said each segment exceeds the threshold value.

16. The coordinating node according to claim 14, wherein the condition comprises a threshold value for defining said any segment as reliable due to an amount of positive results for said any segment in a time frame, wherein the coordinating node is configured for identifying the set of unreliable segments by, for each segment of said at least one segment:
   determining, based on the set of previous analysis results, a ratio between a first number of positive results of the set of previous analysis results and a second number of negative results of the set of previous analysis results, wherein the ratio is determined for the time frame, and
   assigning said each segment to the set of unreliable segments when the ratio for said each segment is less than the threshold value;
   wherein the coordinating node is configured for identifying the set of reliable segments by assigning said each segment to the set of reliable segments when the ratio for said each segment exceeds the threshold value.

17. The coordinating node according to claim 13, wherein the coordinating node is configured for, after performing the respective analysis of each unreliable segment:
   performing a respective analysis of each reliable segment to obtain a respective current further analysis result for said each reliable segment.

18. The coordinating node according to claim 11, wherein the coordinating node is configured for obtaining the set of previous analysis results by receiving, from at least one node along the link, the set of previous analysis results.

19. The coordinating node according to claim 11, wherein the coordinating node is configured for receiving a message for identifying segments of the link, wherein the message includes identifiers of nodes along the link.

20. A computer program product comprising a non-transitory computer readable medium storing a computer program that when executed by at least on processor of a coordinating node causes the coordinating node to perform the method of claim 1.

* * * * *